(12) United States Patent
Ahn et al.

(10) Patent No.: US 11,367,443 B2
(45) Date of Patent: Jun. 21, 2022

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventors: Sangwon Ahn, Suwon-si (KR); Seongil Hahm, Suwon-si (KR); Jeongin Kim, Suwon-si (KR); Seongho Byeon, Suwon-si (KR); Jaesick Shin, Suwon-si (KR); Junsik Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 16/715,903

(22) Filed: Dec. 16, 2019

(65) Prior Publication Data
US 2020/0193994 A1 Jun. 18, 2020

(30) Foreign Application Priority Data
Dec. 17, 2018 (KR) .......................... 10-2018-0163377

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
USPC ...................................................... 704/1–504
See application file for complete search history.

(56) References Cited

U.S. PATENT DOCUMENTS 9,729,821 B1 * 8/2017 Fineberg ................ H04W 4/023
9,749,583 B1 * 8/2017 Fineberg ................ H04N 7/142
(Continued)

FOREIGN PATENT DOCUMENTS

JP 2017-192091 A 10/2017
JP 2018-515965 A 6/2018
(Continued)

OTHER PUBLICATIONS

Written Opinion (PCT/ISA/237) issued by the International Searching Authority in corresponding International Application No. PCT/KR2019/017832, dated Apr. 14, 2020.
(Continued)

*Primary Examiner* — Marcus T Riley
(74) *Attorney, Agent, or Firm* — Sughrue Mion, PLLC

(57) ABSTRACT

Disclosed is an electronic device and a method for controlling the electronic device. The electronic device includes: a microphone, a communication interface, a memory for storing at least one instruction, and a processor configured to execute the at least one instruction to: determine whether a user is present around the electronic device based on voice data of the user obtained via the microphone, determine a device group including the electronic device and at least one other electronic device present around the electronic device, identify at least one device from the device group as a hub device to perform a voice recognition, and based on identifying the electronic device as the hub device, obtain, through the communication interface, a voice data of the user from one or more of the at least one other electronic device, and perform the voice recognition.

18 Claims, 11 Drawing Sheets

(56) References Cited

U.S. PATENT DOCUMENTS

| | | | |
|---|---|---|---|
| 9,779,734 B2* | 10/2017 | Lee | G10L 15/20 |
| 9,812,128 B2* | 11/2017 | Mixter | G10L 15/22 |
| 9,974,015 B2* | 5/2018 | Zakaria | H04W 4/80 |
| 10,102,857 B2* | 10/2018 | Mixter | G10L 15/32 |
| 10,142,591 B1* | 11/2018 | Fineberg | H04L 67/306 |
| 10,237,137 B2* | 3/2019 | Helvey | H04W 4/30 |
| 10,283,138 B2* | 5/2019 | Mixter | G10L 15/30 |
| 10,290,302 B2* | 5/2019 | Heckmann | G06F 1/20 |
| 10,304,463 B2* | 5/2019 | Mixter | G06F 21/32 |
| 10,380,852 B2* | 8/2019 | Horling | G08B 25/008 |
| 10,420,151 B2* | 9/2019 | Zakaria | H04W 12/041 |
| 10,528,228 B2* | 1/2020 | Seixeiro | H04W 68/00 |
| 10,559,306 B2* | 2/2020 | Mixter | G10L 15/32 |
| 10,609,331 B1* | 3/2020 | Fineberg | H04N 7/147 |
| 10,663,938 B2* | 5/2020 | Rexach | G01N 35/00871 |
| 10,672,387 B2* | 6/2020 | Lyon | G10L 15/02 |
| 10,679,608 B2* | 6/2020 | Mixter | G10L 15/22 |
| 10,783,883 B2* | 9/2020 | Mixter | H04L 67/306 |
| 10,860,100 B2* | 12/2020 | Osterhout | G06F 1/163 |
| 2015/0019219 A1* | 1/2015 | Tzirkel-Hancock | G10L 15/22 704/244 |
| 2015/0309316 A1* | 10/2015 | Osterhout | G06F 3/014 345/8 |
| 2015/0358777 A1* | 12/2015 | Gupta | H04W 4/02 370/254 |
| 2017/0025124 A1* | 1/2017 | Mixter | G10L 15/22 |
| 2017/0084277 A1* | 3/2017 | Sharifi | G10L 15/22 |
| 2017/0105095 A1* | 4/2017 | Um | H04W 4/33 |
| 2017/0127622 A1* | 5/2017 | Hong | A01G 22/00 |
| 2017/0168566 A1* | 6/2017 | Osterhout | G06F 3/04815 |
| 2017/0206064 A1* | 7/2017 | Breazeal | G06F 8/34 |
| 2017/0330564 A1* | 11/2017 | Daley | H04R 3/12 |
| 2017/0344114 A1* | 11/2017 | Osterhout | G02B 27/017 |
| 2018/0040322 A1* | 2/2018 | Mixter | G10L 15/22 |
| 2018/0054231 A1* | 2/2018 | Malach | H04B 1/48 |
| 2018/0077025 A1* | 3/2018 | Helvey | H04L 67/125 |
| 2018/0096690 A1* | 4/2018 | Mixter | G10L 25/51 |
| 2018/0096696 A1* | 4/2018 | Mixter | G10L 15/30 |
| 2018/0122378 A1* | 5/2018 | Mixter | H04L 67/306 |
| 2018/0190264 A1* | 7/2018 | Mixter | G10L 15/22 |
| 2018/0190285 A1* | 7/2018 | Heckmann | G06F 1/20 |
| 2018/0330589 A1* | 11/2018 | Horling | G06F 3/167 |
| 2019/0051303 A1* | 2/2019 | Mixter | G10L 15/22 |
| 2019/0089550 A1* | 3/2019 | Rexach | H04L 12/282 |
| 2019/0090056 A1* | 3/2019 | Rexach | H04R 3/005 |
| 2019/0146438 A1* | 5/2019 | Rexach | C02F 1/001 700/275 |
| 2019/0221215 A1* | 7/2019 | Mixter | G10L 25/51 |
| 2019/0355365 A1* | 11/2019 | Kim | G10L 15/22 |
| 2020/0193994 A1* | 6/2020 | Ahn | G10L 15/30 |

FOREIGN PATENT DOCUMENTS

| | | |
|---|---|---|
| KR | 10-2015-0113701 A | 10/2015 |
| KR | 10-2018-0083587 A | 7/2018 |

OTHER PUBLICATIONS

International Search Report (PCT/ISA/210), issued by International Searching Authority in corresponding International Application No. PCT/KR2019/017832, dated Apr. 14, 2020.

* cited by examiner

ELECTRONIC DEVICE AND METHOD FOR CONTROLLING ELECTRONIC DEVICE

CROSS-REFERENCE TO RELATED APPLICATION(S)

This application is based on and claims priority under 35 U.S.C. § 119 to Korean Patent Application No. 10-2018-0163377, filed on Dec. 17, 2018, in the Korean Intellectual Property Office, the disclosure of which is incorporated by reference herein in its entirety.

BACKGROUND

1. Field

The disclosure relates to an electronic device and a method for controlling the electronic device, and more specifically to an electronic device capable of identifying an electronic device that recognizes a voice of a user from a plurality of electronic devices present within the home and providing an interactive service and a method for controlling thereof.

2. Description of Related Art

Recently, artificial intelligence systems are being employed in various fields. Unlike existing rule based smart systems, an artificial intelligence system is a system in which a machine becomes smart by self-learning and determination. The more the artificial intelligence system is used, recognition rate improves and user preference is more accurately understood. Thus, existing rule based smart systems are gradually being replaced with deep learning based artificial intelligence systems.

Artificial intelligence technology includes machine learning (for example, deep learning) and element technologies utilizing machine learning.

Machine learning is an algorithm technology that classifies/learns the characteristics of input data by itself, and element technology is a technology that simulates functions such as recognition and determination of human brain utilizing machine learned algorithms such as deep learning. Artificial intelligence technology is applicable to technical fields such as linguistic understanding, visual understanding, inference/prediction, knowledge representation, and motion control.

Linguistic understanding is a technology in which language/text of humans is recognized and applied/processed and includes natural language processing, machine translation, dialogue system, answering questions, recognizing/synthesizing voice, and the like. Visual understanding is a technology that processes things as recognized visually by a human, and includes object recognition, object tracking, image search, person recognition, scene understanding, space understanding, image improvement, and the like. Inference prediction is a technology that determines information logically by inference and prediction, and includes knowledge/likelihood based inference, optimization prediction, preference based planning, recommendation and the like. Knowledge representation is a technology that automatically processes experience information of humans to knowledge data and includes knowledge construction (generating/classifying data), knowledge management (utilizing data), and the like. Motion control is a technology for controlling the autonomous driving of a vehicle and the movement of a robot, and includes movement control (navigation, collision, driving), manipulation control (behavior control), and the like.

Recently, an interactive service that recognizes a user voice using various electronic devices present in the home and provides a response to the user voice or control instructions.

However, related art devices receiving a user voice transmit voice data of a user to a pre-defined hub device, and the hub device provides an interactive service based on the voice data of the user. In the case of a predetermined hub device providing an interactive service such as described above, voice recognition may be performed by using voice data including static because the voice data is received far from the user. Further, various problems such as loss of voice data, decrease in performance and weakening of security may arise. Also, since data may be concentrated on one hub device, problems such as an increase in network congestion and a network bottleneck phenomenon may arise.

SUMMA

Provided are an electronic device capable of providing an interactive service by deciding on a hub device adaptively according to a location of a user and a method for controlling thereof.

Additional aspects will be set forth in part in the description which follows and, in part, will be apparent from the description, or may be learned by practice of the presented embodiments.

In accordance with an aspect of the disclosure, an electronic device includes: a microphone; a communication interface; a memory for storing at least one instruction; and a processor configured to execute the at least one instruction to: determine whether a user is present around the electronic device based on voice data of the user obtained via the microphone, based on determining that the user is present around the electronic device, determine a device group including the electronic device and at least one other electronic device present around the electronic device, identify, based on information on the at least one other electronic device obtained respectively from the at least one other electronic device, at least one device from the device group as a hub device to perform a voice recognition, and based on identifying the electronic device as the hub device, obtain, through the communication interface, a voice data of the user from one or more of the at least one other electronic device, and perform the voice recognition.

The processor may be further configured to execute the at least one instruction to determine whether the user is present around the electronic device using at least one of use information of the electronic device, statistical information on use of the electronic device, or movement information of the user.

The processor may be further configured to execute the at least one instruction to: based on determining that the user is present around the electronic device, obtain information on the voice data of the user from a plurality of other electronic devices through the communication interface; identify the at least one other electronic device, from the plurality of other electronic devices, that obtained the voice data of the user having a volume greater than or equal to a threshold value; and determine the device group as including the identified at least one other electronic device.

The processor may be further configured to execute the at least one instruction to: based on determining that the user is present around the electronic device, identify the at least one other electronic device based on a location of the electronic device; and determine the device group as including the identified at least one other electronic device.

The information on the at least one other electronic device may include at least one of information on internet connection status of the at least one other electronic device, information on a power status of the at least one other electronic device, information on memory of the at least one other electronic device, information on distance between the at least one other electronic device and the user, and information on a voice recognition function of the at least one other electronic device.

The processor may be further configured to execute the at least one instruction to: control the communication interface to transmit the voice data of the user received from the one or more of the at least one other electronic device; and obtain, through the communication interface from an external server, at least one of a response to the voice data of the user and a control instruction corresponding to the voice data of the user.

The processor may be further configured to execute the at least one instruction to: identify a device to output the response to the voice data of the user from among devices included in the device group based on a location of the user; and control the communication interface to transmit, to the identified device the response to the voice data of the user.

The processor may be further configured to execute the at least one instruction to identify at least one of a response to the voice data of the user or a control instruction corresponding to the voice data of the user based on the voice data of the user obtained from the one or more of the at least one other electronic devices.

The processor may be further configured to execute the at least one instruction to, based on one other electronic device from among the at least one other electronic device being identified as the hub device, control the communication interface to transmit the voice data of the user obtained through the microphone to the one other electronic device identified as the hub device.

The processor may be further configured to execute the at least one instruction to, based on no user being detected around the electronic device, terminate the voice recognition.

In accordance with another aspect of the disclosure, a control method of an electronic device includes: determining whether a user is present around the electronic device based on voice data of the user received through a microphone; based on determining that the user is present around the electronic device, determining a device group including the electronic device and at least one other electronic device present around the electronic device; identifying, based on information on the at least one other electronic device obtained from the at least one other electronic device, at least one device from the device group as a hub device to perform a voice recognition; and based on identifying the electronic device as the hub device, obtaining a voice data of the user from one or more of the at least one other electronic device, and performing the voice recognition.

The determining whether the user is present around the electronic device may include determining whether the user is present around the electronic device using at least one of use information of the electronic device, statistical information on use of the electronic device, or movement information of the user.

The determining the device group may include: based on determining that the user is present around the electronic device, obtaining information on the voice data of the user from a plurality of other electronic devices; identifying the at least one other electronic device, from the plurality of other electronic device, that obtained the voice data of the user having a volume greater than or equal to a threshold value; and determining the device group as including the identified at least one other electronic device.

The determining the device group may include: based on determining that the user is present around the electronic device, identifying the at least one other electronic device based on a location of the electronic device; and determining the device group as including the identified at least one other electronic device.

The information on the at least one other electronic device may include at least one of information on internet connection status of the at least one other electronic device, information on a power status of the at least one other electronic device, information on memory of the at least one other electronic device, information on distance between the at least one other electronic device and the user, or information on a voice recognition function of the at least one other electronic device.

The performing the voice recognition may include: transmitting, to an external server, the voice data of the user received from the one or more of the at least one other electronic devices; and obtaining, from the external server, at least one of a response to the voice data of the user and a control instruction corresponding to the voice data of the user.

The control method may further include: identifying a device to output the response to the voice data of the user from among devices included in the device group based on a location of the user; and transmitting, to the identified device, the response to the voice data of the user.

The control method may further include: identifying at least one of a response to the voice data of the user and a control instruction corresponding to the voice data of the user based on the voice data of the user obtained from the one or more of the at least one other electronic device.

The control method may further include, based on one other electronic device from among the at least one other electronic device being identified as the hub device, transmitting the voice data of the user received through the microphone to the one other electronic device identified as the hub device.

The control method may further include, based on no user being detected around the electronic device, terminating the voice recognition.

In accordance with another aspect of the disclosure, a non-transitory computer-readable recording medium has recorded thereon at least one instruction executable by a processor of an electronic device to cause the electronic device to perform a control method including: determining whether a user is present around the electronic device based on voice data of the user received through a microphone; based on determining that the user is present around the electronic device, determining a device group including the electronic device and at least one other electronic device present around the electronic device; identifying, based on information on the at least one other electronic device obtained from the at least one other electronic device, at least one device from the device group as a hub device to perform a voice recognition; and based on identifying the electronic device as the hub device, obtaining a voice data of the user from one or more of the at least one other electronic device, and performing the voice recognition.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
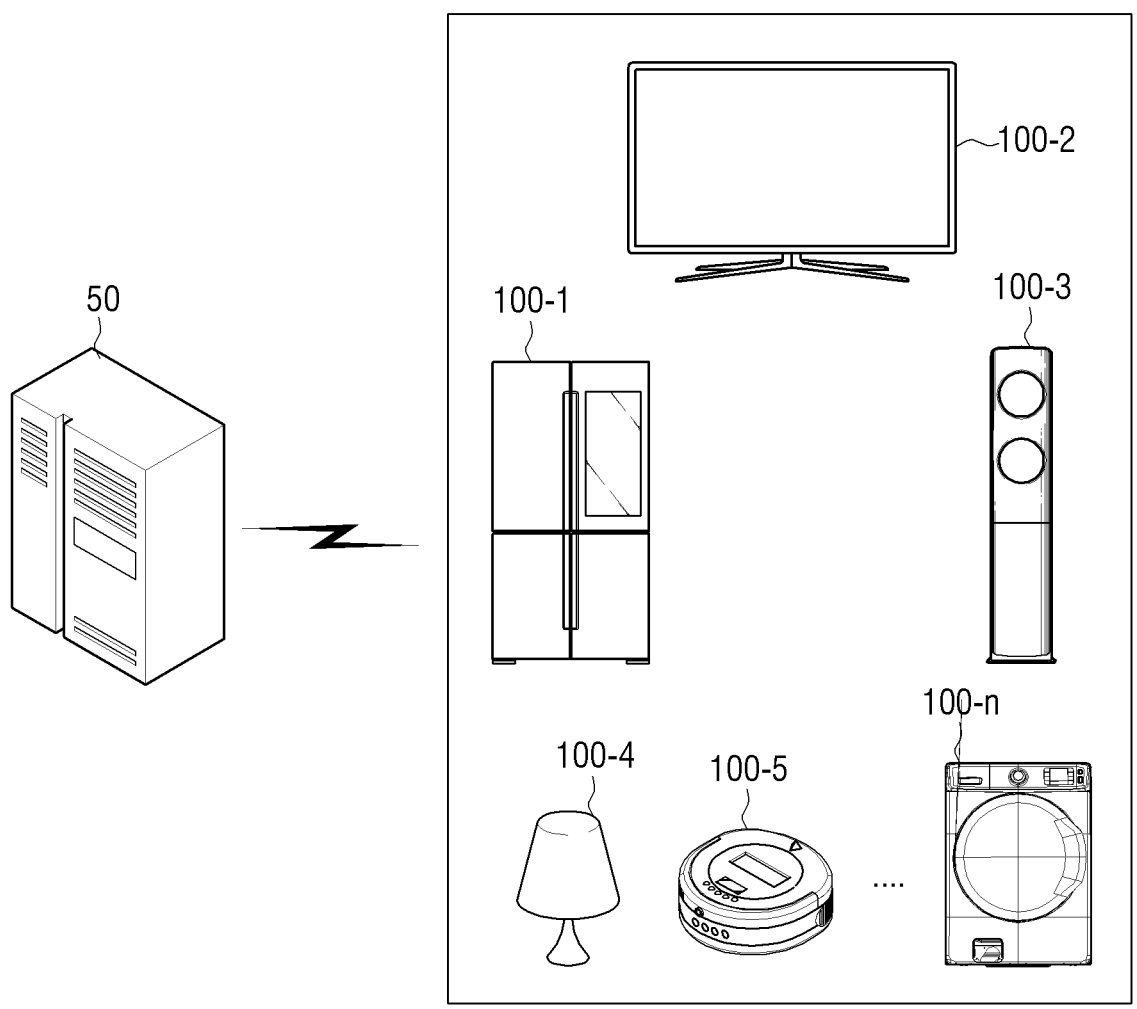
FIG. 1 is a diagram provided to describe a dialogue system providing a response to a voice of a user using a plurality of electronic devices within a home according to an embodiment.

Herein, various embodiments of the present disclosure are described with reference to the accompanying drawings. However, it should be noted that the various embodiments are not for limiting the scope of the disclosure to a specific embodiment, but should be interpreted to include all modifications, combinations, equivalents and/or alternatives of the embodiments. In describing the embodiments, like reference numerals may be used to refer to like elements.

In the present disclosure, expressions such as "comprise," "may comprise," "consist of," "may consist of," or the like are used to designate a presence of a corresponding characteristic (e.g., elements such as numerical value, function, operation, or component, etc.), and not to preclude a presence or a possibility of additional characteristics.

In the present disclosure, expressions such as "A or B," "at least one of A and/or B," or "one or more of A and/or B" should be understood to include all possible combinations of the items listed together. For example, "A or B," "at least one of A and B," or "at least one of A or B" should be understood to represent all cases including (1) at least one of A, (2) at least one of B, or (3) at least one of A and at least one of B.

Expressions such as "first" and "second" as used herein may denote various elements, regardless of order and/or importance, may be used to distinguish one element from another, and does not limit the corresponding elements.

In the descriptions, when a certain element (e.g., first element) is indicated as being "(operatively or communicatively) coupled with/to" or "connected to" another element (e.g., second element), it could be understood as the certain element being directly coupled with/to the other element or as being coupled through still another element (e.g., third element). On the other hand, when a certain element (e.g., first element) is indicated as "directly coupled with/to" or "connected to" another element (e.g., second element), it could be understood as still another element (e.g., third element) not being present between the certain element and the other element.

The expression "configured to . . . (or set up to)" used in the present disclosure may be used interchangeably with, for example, "suitable for . . . ," "having the capacity to . . . ," "designed to . . . ," "adapt ed to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may be configured with . . . " together with another device or components. For example, the phrase "a sub-processor configured to (or set up to) perform A, B, or C" may mean a processor dedicated to perform a corresponding operation (e.g., embedded processor), or a generic-purpose processor (e.g., a CPU or an application processor) capable of performing the corresponding operations by executing one or more software programs stored in the memory device.

In this disclosure, the term "user" may refer to a person using an electronic device or a device (e.g., artificial intelligence electronic device) that uses an electronic device.

Herein, the present disclosure will be described in detail with reference to the accompanying drawings. FIG. 1 is a diagram provided to describe a dialogue system providing a response to a voice of a user using a plurality of electronic devices 100-1 to 100-n within a home according to an embodiment. The dialogue system may include the plurality of electronic devices 100-1 to 100-n and an external server 50.

The plurality of electronic devices 100-1 to 100-n are electronic devices located within a home, and may receive input of a voice of a user using a microphone or may be coupled to an external device provided with a microphone receiving information related to voice instructions of a user. For example, an electronic device may include at least one of televisions, digital video disk (DVD) players, audios, refrigerators, cleaners, ovens, microwaves, washing machines, air purifiers, set top boxes, home automation control panels, security control panels, media boxes (e.g., SAMSUNG HOMESYNC™, APPLE TV™, or GOOGLE TV™), game consoles (e.g., XBOX™, PLAYSTATION™, etc.), electronic dictionaries, electronic keys, camcorders, or electronic frames. Furthermore, the electronic device may include at least one of smartphones, tablet personal computers (PCs), mobile phones, video telephones, electronic book readers, desktop PCs, laptop PCs, netbook computers, workstations, servers, a personal digital assistant (PDA), a portable multimedia player (PMP), an MP3 player, a medical device, a camera, or a wearable device. A wearable device may include at least one of an accessory type (e.g., a watch, a ring, a bracelet, an anklet, a necklace, a pair of glasses, a contact lens or a head-mounted-device (HMD)), a fabric or a garment-embedded type (e.g., an electronic clothing), a body-attached type (e.g., a skin pad or a tattoo), or a bio-implantable circuit.

Each of the plurality of electronic devices 100-1 to 100-$n$ may receive input of a voice of a user through a microphone. The voice of the user is a trigger voice or a wakeup voice to perform an interactive service, and may be a word such as "Bixby." The interactive service refers to a service that provides a response to the voice of the user using an artificial intelligence program, and analyzes the voice of the user to provide to the electronic device by deciding on a control instruction.

Each of the plurality of electronic devices 100-1 to 100-$n$ may identify (or determine) whether a user is present around the electronic device currently based on a voice of the user received from the microphone. Specifically, based on a volume of the voice of the user received through the microphone being greater than or equal to a threshold (e.g., predetermined) value, the electronic device 100 may identify that a user is present around the electronic device 100.

In addition, each of the plurality of electronic devices 100-1 to 100-$n$ may identify whether a user is present around the electronic device from not only the volume of the voice of the user, but also from using at least one of use information of the electronic device 100, statistical information on use of the electronic device 100, and movement information of the user. For example, each of the plurality of electronic devices 100-1 to 100-$n$ may identify whether a user is present around the electronic device 100 based on use information such as whether a user instruction has been input through the input interface (for example, remote control, button, etc.) provided in the electronic device 100 within a threshold time, may identify whether a user is present around the electronic device 100 based on a user's use statistic of the electronic device per time (or a user's statistical information per location), and may identify whether a user is present around the electronic device 100 based on whether movement by the user is detected through a motion sensor or the like.

Specifically, the electronic device 100 may calculate the likelihood value of a user being present around the electronic device 100 using at least one of a volume of the voice of the user, use information of the electronic device 100, statistical information on use of the electronic device 100, and movement information of the user, and based on a likelihood value of a threshold value or more being calculated, the electronic device 100 may identify that a user is present around the electronic device.

Based on identifying that a user is present around a first electronic device 100-1 from among the plurality of electronic devices 100-1 to 100-$n$, the first electronic device 100-1 may identify a device group including the first electronic device 100-1 and other electronic device.

According to an embodiment, the first electronic device 100-1 receives information on a trigger voice of user from a plurality of other electronic devices through a communication interface, determines (e.g., identifies) at least one other electronic device that detected the trigger voice of the user having a volume of a threshold value or more from the plurality of other electronic devices, and may identify the device group including one or more of the determined at least one other electronic device.

According to another embodiment, the first electronic device 100-1 may determine at least one other electronic device based on a location of the first electronic device 100-1, and may identify the device group including one or more of the determined at least one other electronic device.

For example, based on the location of the first electronic device 100-1 being a family room, the first electronic device 100-1 may identify the at least one other electronic device located in the family room as the device group. At this time, information on the at least one other electronic device located in the family room may be pre-stored.

The first electronic device 100-1 may identify one device from the device group as a hub device to perform a voice recognition based on information on the other electronic device received from at least one of the respective other electronic devices in the device group. At this time, information on the other electronic device may include at least one of information on an Internet connection status of the other electronic device, information on a power status of the other electronic device, information on a memory of the other electronic device, information on distance between the other electronic device and the user, and information on the voice recognition function of the other electronic device. Further, the first electronic device 100-1 may transmit information on the first electronic device 100-1 and information on the voice of the user received in the first electronic device 100-1 to at least one of the respective other electronic devices in the device group.

The information on the other electronic device may be transmitted in the device group in real-time, though it is understood that one or more other embodiments are not limited thereto. For example, according to another embodiment, at least a part of information on the other electronic device (for example, information on the performance of the other electronic device, etc.) may be pre-stored.

Based on the first electronic device 100-1 being identified as a hub device, the first electronic device 100-1 may control the electronic device in the home or may obtain the voice data of the user to receive a response using a microphone included in the first electronic device 100-1. At this time, the first electronic device 100-1 may control the electronic device in the home or may receive the voice data of the user to receive a response from the other electronic devices included in the device group.

The first electronic device 100-1 may gather (e.g., receive) the voice data of the user obtained from the first electronic device 100-1 and the voice data of the user received from the other electronic devices and perform voice recognition. At this time, the voice recognition may include at least one of converting the voice data into text data and generating a response or a control instruction using the text data converted from the voice data. Specifically, the first electronic device 100-1 may gather voice data based on the distance between the electronic device and the user and the number of microphones provided in the electronic device. That is, the first electronic device 100-1 adds high weight to voice data received by the electronic device closest to the user and the electronic device with a large (or relatively higher) number of microphones through which the voice data is gathered.

Specifically, the first electronic device 100-1 may transmit the gathered voice data to the external server 50. The external server 50 may use a dialogue system to recognize the voice data of the user, and may decide at least one of a response to the voice data of the user and a control instruction. The external server 50 may transmit the at least one of the response and the control instruction to the first electronic device 100-1. FIG. 1 illustrates a single external server 50, but it is understood that one or more other embodiments are not limited thereto. For example, the external server 50 may be implemented as a first external server for providing a response and a second external server for identifying the control instruction.

The first electronic device 100-1 outputs the received response and may identify the device to perform the control instruction. At this time, the device to output the received response and to perform the control instruction may be the same or different devices. For example, the first electronic device 100-1 may decide a second electronic device 100-2 as a device to output the received response, and may decide a third electronic device 100-3 as a device to perform the control instruction. Further, the first electronic device 100-1 may decide a device to output a response based on a location of the user and information on a speaker. Specifically, the first electronic device 100-1 may decide a device to output a response considering a distance to the user and a performance of the speaker (for example, output amount) from the electronic devices in which a speaker is present. Further, the first electronic device 100-1 may transmit a response to the device to output the received response and may transmit a control instruction to a device to perform the control instruction.

Based on other electronic device that is not the first electronic device 100-1 in the device group being identified as a hub device, the first electronic device 100-1 may use the microphone included in the first electronic device 100-1 to control the electronic device in the home or obtain the voice data of the user to receive a response, and may transmit the obtained voice data of the user to the other electronic device identified as the hub device.

Based on a dialogue system being stored within the first electronic device 100-1, the first electronic device 100-1 may use the dialogue system to recognize the gathered voice data, and may identify (e.g., determine) at least one of the response to the voice data of the user and the control instruction.

At this time, the first electronic device 100-1 may use an artificial intelligence agent to provide a response to the voice of the user as described above. The artificial intelligence agent is a program dedicated to providing an artificial intelligence (AI)-based interactive service (for example, voice recognition service, personal assistant service, translation service, search service, etc.), and may be executed by a general processor (for example, central processing unit (CPU)) or a separate AI dedicated processor (for example, neural processing unit (NPU) or graphics processing unit (GPU), etc.). Specifically, the artificial intelligence agent may control various modules (for example, a dialogue system) which are described hereafter.

Based on a predetermined voice of user (for example, "Bixby", etc.) being input or a button (for example, a button for executing artificial intelligence agent) provided in the first electronic device 100-1 being pressed, the artificial intelligence agent may be operated. Further, the artificial intelligence agent may provide a response to the voice of the user.

In a case in which the predetermined voice of the user (for example, "Bixby," etc.) is input or the button (for example, button for executing the artificial intelligence agent) provided in the first electronic device 100-1 is pressed, the artificial intelligence agent may be operated. Further, the artificial intelligence agent may already be in a pre-executed state prior to the predetermined voice of the user (for example, "Bixby," etc.) being input or the button (for example, button for executing the artificial intelligence agent) provided in the first electronic device 100-1 being pressed. In this case, the artificial intelligence agent of the first electronic device 100-1 may provide a response to a question of the user after the predetermined voice of the user (for example, "Bixby," etc.) is input or the button (for example, button for executing the artificial intelligence agent) provided in the first electronic device 100-1 is pressed. For example, based on the artificial intelligence agent being executed by a AI dedicated processor, functions of the first electronic device 100-1 are executed by a general processor prior to the predetermined voice of the user (for example, "Bixby," etc.) being input or the button (for example, button for executing the artificial intelligence agent) provided in the first electronic device 100-1 being pressed, and after the predetermined voice of the user (for example, "Bixby," etc.) is input or the button (for example, button for executing the artificial intelligence agent) provided in the first electronic device 100-1 is pressed, the functions of the first electronic device 100-1 may be executed by the AI dedicated processor.

In addition, the artificial intelligence agent may be in a standby state prior to the predetermined voice of the user (for example, "Bixby," etc.) being input or the button (for example, button for executing the artificial intelligence agent) provided in the first electronic device 100-1 being pressed. Herein, a standby state refers to a state for detecting the receiving of a pre-defined user input for controlling the start of operation of the artificial intelligence agent. Based on the predetermined voice of the user being input or the button provided in the first electronic device 100-1 being pressed while the artificial intelligence agent is in the standby state, the first electronic device 100-1 may operate the artificial intelligence agent, and may provide a response to the voice of the user using the operated artificial intelligence agent.

In addition, the artificial intelligence agent may be in a terminated state prior to the predetermined voice of the user (for example, "Bixby," etc.) being input or the button (for example, button for executing the artificial intelligence agent) provided in the first electronic device 100-1 being pressed. Based on the predetermined voice of the user being input or the button provided in the first electronic device 100-1 being pressed in a state in which the artificial intelligence agent is terminated, the first electronic device 100-1 may execute the artificial intelligence agent, and may provide a response to the voice of the user using the executed artificial intelligence agent.

The artificial intelligence agent may control various devices or modules, which are described below.

Figure 2:
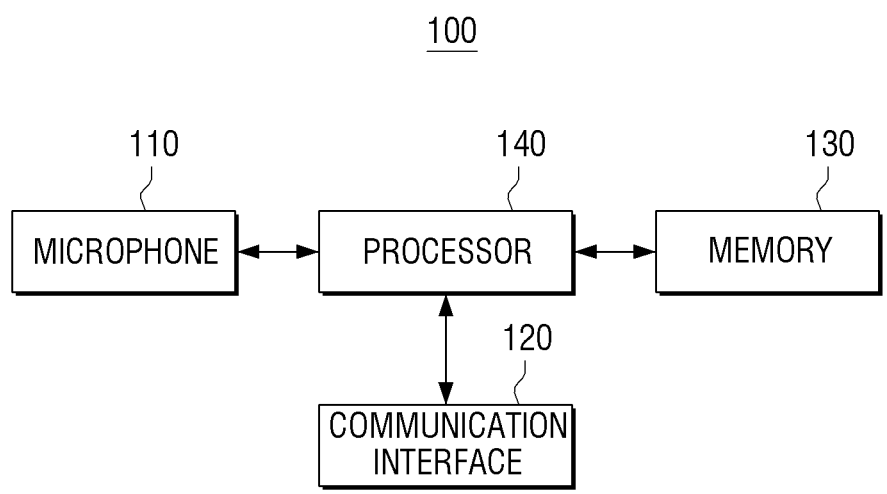
FIG. 2 is a block diagram of a configuration of an electronic device according to an embodiment.

FIG. 2 is a block diagram of a configuration of an electronic device 100 according to an embodiment. As shown in FIG. 2, the electronic device 100 may include a microphone 110, a communication interface 120, a memory 130, and a processor 140. It is understood, however, that the above are not limited to the above-described components, and some components may be added or omitted according to the type of the electronic device.

The microphone 110 may receive input of the voice of the user. At this time, the microphone 110 may receive a trigger voice (or wakeup voice) indicating recognition of voice, and may control at least one of a plurality of electronic devices in the home or receive a voice (e.g., voice input) of the user to receive a response. The microphone 110 may be provided in the electronic device 100, or may be provided externally to be electrically coupled with the electronic device 100.

The communication interface 120 may perform communication with an external electronic device. The communication interface 120 being communicatively coupled with an external device may include communicating through a third device (for example, a repeater, a hub, an access point, a server or a gateway, etc.) or direct (e.g., peer-to-peer) communication with the external device.

The communication interface 120 may include various communication modules for performing communication with the external device. For example, the communication interface 120 may include at least one of a wireless communication module and a cellular communication module using at least one from, for example, long term evolution (LTE), LTE advanced (LTE-A), code division multiple access (CDMA), wideband CDMA (WCDMA), universal mobile telecommunications system (UMTS), Wireless Broadband (WiBro), or Global System for Mobile Communications (GSM). Further, the wireless communication module, may include at least one of, for example, wireless fidelity (WiFi), Bluetooth, Bluetooth Low Energy (BLE), Zigbee, near field communication (NFC), magnetic secure transmission, radio frequency (RF), or body area network (BAN). Also, the communication interface 120 may include a wired communication module, and may include at least one of, for example, universal serial bus (USB), high definition multimedia interface (HDMI), recommended standard 232 (RS-232), power line communication (PLC), or plain old telephone service (POTS). A network performing wireless communication or wired communication may include at least one of, for example, a telecommunication network, a computer network (e.g., LAN or WAN), the Internet, or a telephone network.

In addition, the communication interface 120 may receive information on the other electronic device from the surrounding other electronic devices and information on the voice of the user received by the other electronic device. Further, the communication interface 120 may receive information on the electronic device 100 from the surrounding other electronic devices and information on the voice of the user that the electronic device received through the microphone 110. Also, the communication interface 120 may transmit information on the electronic device 100 and information on the voice of the user received by the electronic device through the microphone 110 to the surrounding other electronic devices.

In addition, the communication interface 120 may transmit the gathered voice data of the user to the external server 50, and may receive a response to the voice data of the user or the control instruction from the external server 50.

The communication interface 120 may perform communication between the surrounding other electronic device and the external server 50 through a different communication module. For example, the communication interface 120 may use a surrounding other electronic device and a near field communication module (for example, Bluetooth communication module, Zigbee communication module, infrared (IR) communication module, etc.) to perform communication, and may use an external server and a long range communication module (for example, LTE communication module, 5th generation (5G) communication module, WiFi communication module, etc.) to perform communication.

The memory 130 may store an instruction or data related to at least one other element of the electronic device 100. Specifically, the memory 130 may be implemented as at least one of a non-volatile memory, a volatile memory, a flash-memory, a hard disk drive or a solid state drive (SDD), or the like. The memory 130 may be accessed by the processor 140, and reading/recording/modifying/deleting/renewing or the like of data may be performed by the processor 140. The term memory in the present disclosure may include a memory 130, a read-only memory (ROM) in a processor 140, a random access memory (RAM), or a memory card mounted in the electronic device 100 (e.g., micro SD card, memory stick). Further, the memory 130 may store programs, data, and the like to constitute various screens to be displayed in a display area of a display.

In addition, the memory 130 may store an artificial intelligence agent to operate a dialogue system. Specifically, the electronic device 100 may use the artificial intelligence agent to generate a natural language as a response to user utterance. Herein, the artificial intelligence agent is a program dedicated to provide an artificial intelligence (AI)-based service (for example, a voice recognition service, a personal assistant service, a translation service, a search service, etc.). Specifically, the artificial intelligence agent may be executed by a general processor (for example, CPU) or a separate AI dedicated processor (for example, GPU, etc.).

Figure 8:
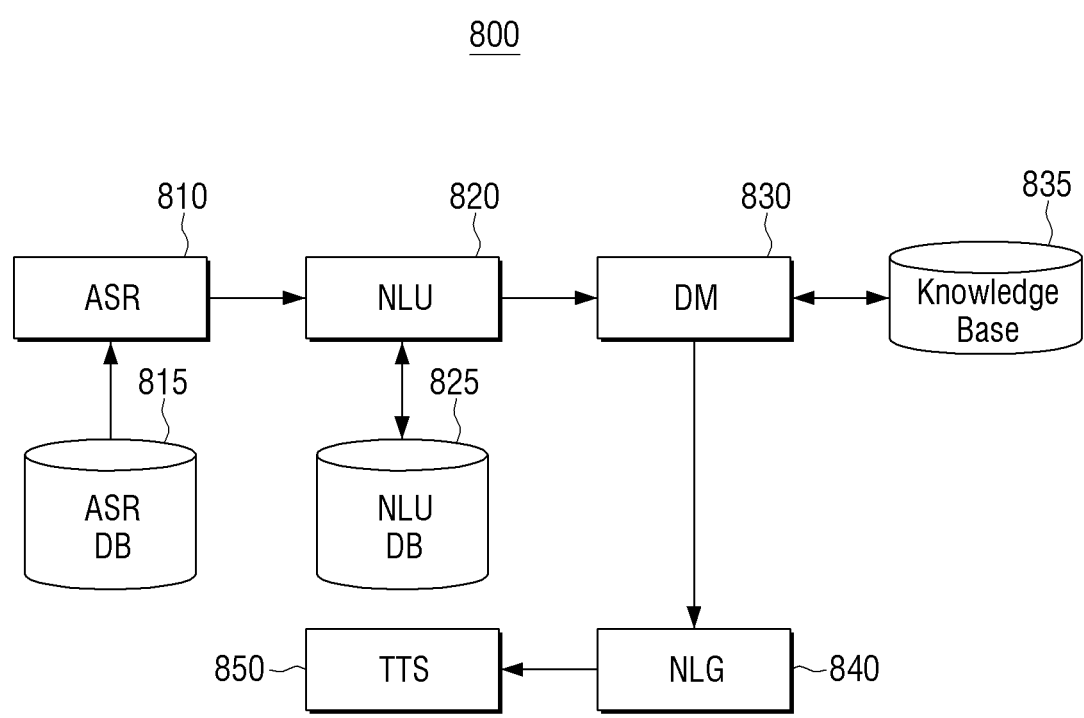
FIG. 8 is a block diagram of a dialogue system of an artificial intelligence agent system according to an embodiment.

In addition, based on the electronic device 100 providing an interactive service directly, the memory 130 may include a plurality of configurations (or modules) that constitute the dialogue system as shown in FIG. 8. This is described in detail below with reference to FIG. 8.

The processor 140 (e.g., at least one processor) is electrically coupled with the memory 130 and may control the overall operation and function of the electronic device 100. Specifically, the processor 140 may determine whether a user is present around the electronic device 100 based on the voice of the user received through the microphone 110. Based on determining a user as being present around the electronic device, the processor 140 may identify a device group including the electronic device 100 and at least one other electronic device present around the electronic device 100, and may decide a hub device for performing voice recognition on one device from the device group based on information on the other electronic device received from at least one of the respective other electronic devices. Based on the electronic device 100 being identified as the hub device, the processor 140 may perform voice recognition by receiving voice data of the user from at least one of the respective other electronic devices through the communication interface 120.

Specifically, the electronic device 100 may determine whether a user is present around the electronic device 100 based on the voice of the user received through the microphone 110. For example, based on the volume of the voice of the user received through the microphone 110 being greater than or equal to a threshold value, the electronic device 100 may determine that a user is present around the electronic device 100.

In addition, the processor 140 may determine whether a user is present around the electronic device using at least one from not only the voice of the user, but also at least one of use information of the electronic device 100, use statistics information of the electronic device 100, and movement information of the user.

Based on identifying that a user is present around the electronic device 100, the processor 140 may identify the device group including the electronic device 100 and at least one other electronic device. For example, the processor 140 may receive information on the voice of the user from the plurality of other electronic devices through the communication interface 110, and identify at least one other electronic device that detected the voice of the user having a volume of a threshold value or more from the plurality of other electronic device, and identify the device group including the at least one of the identified other electronic device and the electronic device 100.

Based on the device group being identified, the processor 140 may identify a hub device to perform voice recognition as one device from the device group based on information on the other electronic device received from at least one of the respective other electronic devices. Herein, information on the other electronic device may include at least one of information on an Internet connection status of the other electronic device, information on a power status of the other electronic device, information on a memory of the other electronic device, information on a distance between the other electronic device and the user, and information on the voice recognition function of the other electronic device.

Specifically, based on the electronic device 100 being identified as the hub device, the processor 140 may control the communication interface 120 to gather the voice data of the user obtained through the microphone 110 and voice data of the user received from at least one of the respective other electronic devices to transmit to the external server 50, and may receive at least one of a response to the voice data of the user gathered from the external server through the communication interface 120 and a control instruction corresponding to the gathered (e.g., captured, recorded, etc.) voice data of the user.

In addition, the processor 140 may identify a device to output the response to the voice data of the user from devices included in the device group based on the location of the user, and may control the communication interface 120 to transmit a response to the voice data of the user to the identified device.

Further, the processor 140 may identify at least one of a response to the voice data of the user and a control instruction corresponding to the voice data of the user based on the voice data of the user received from at least one of the respective other electronic devices. Herein, the processor 140 may use the dialogue system of FIG. 8 stored in the memory 130 to decide at least one of the response or the control instruction.

Also, based on one of at least one other electronic device being identified as the hub device, the processor 140 may control the communication interface 120 to transmit the voice data of the user received (e.g., captured, recorded, etc.) through the microphone 110 to the other electronic device identified as the hub device.

Further, based on a user not being detected around the electronic device 100 while performing voice recognition, the processor 140 may terminate the voice recognition.

Figure 3:
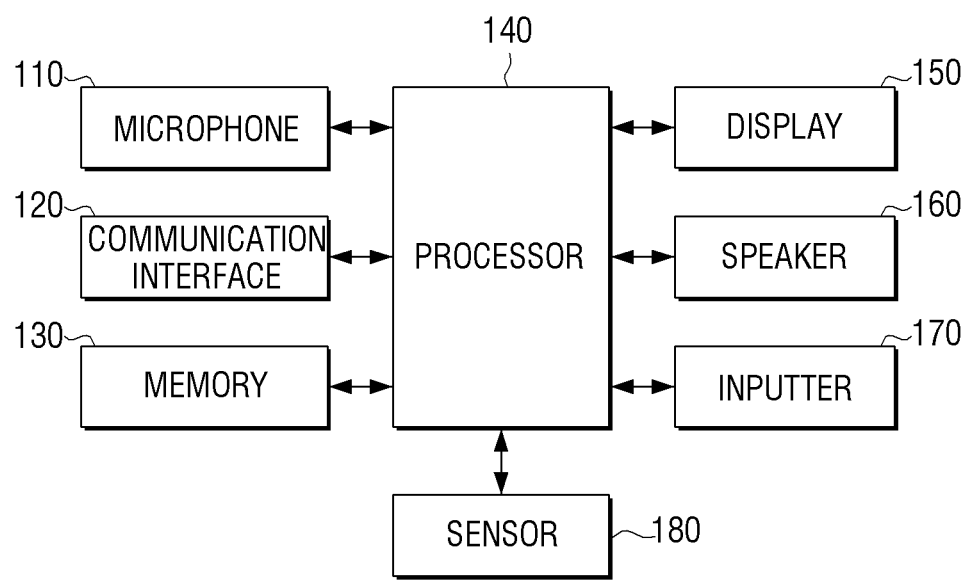
FIG. 3 is a block diagram of a configuration of an electronic device according to an embodiment.

FIG. 3 is a block diagram provided to specifically show a configuration of an electronic device 100 according to an embodiment. As shown in FIG. 3, the electronic device 100 may include a microphone 110, a communication interface 120, a memory 130, a display 150, a speaker 160, an inputter 170, a sensor 180, and a processor 140. The microphone 110, the communication interface 120, the memory 130, and the processor 140 shown in FIG. 3 are the same as or similar to those described with reference to FIG. 2, and repetitive descriptions may be omitted below.

The display 150 may display various information according to control of the processor 140. Specifically, the display 150 may display a message for providing a response to the voice of the user. The display 150 may be implemented as a touch panel together with a touch screen.

The speaker 160 is configured to output not only various audio data processed by various processing operations such as decoding, amplifying, and noise filtering, but also various notification sounds or voice messages. Specifically, the speaker 160 may output the response to the voice of the user as a voice message of a natural language format. The configuration to output audio may be implemented with the speaker, or may be implemented as an output terminal capable of outputting audio data.

The inputter 170 may receive a user input to control the electronic device 100. Specifically, the inputter 170 may include a touch panel to receive a touch input of a user touch via the hand of the user or a stylus pen or the like, a button to receive a user manipulation, or the like. In addition to the above, the inputter 170 may be implemented as a different input device (for example, keyboard, mouse, motion inputter, etc.).

The sensor 180 may detect various status information of the electronic device 100. For example, the sensor 180 may include a motion sensor for detecting the movement information of the electronic device 100 (for example, a gyro sensor, an acceleration sensor, etc.), a sensor for detecting the location information (for example, a global positioning system (GPS) sensor), a sensor for detecting environmental information around the electronic device 100 (for example, temperature sensor, humidity sensor, atmospheric pressure sensor, etc.), a sensor for detecting user information of the electronic device 100 (for example, blood pressure sensor, glucose sensor, heart rate sensor, etc.), a sensor for detecting the presence of a user (for example, camera, ultra-wideband (UWB) sensor, IR sensor, proximity sensor, optical sensor, or the like). In addition to the above, the sensor 180 may further include an image sensor or the like to photograph the exterior of the electronic device 100.

Figure 4:
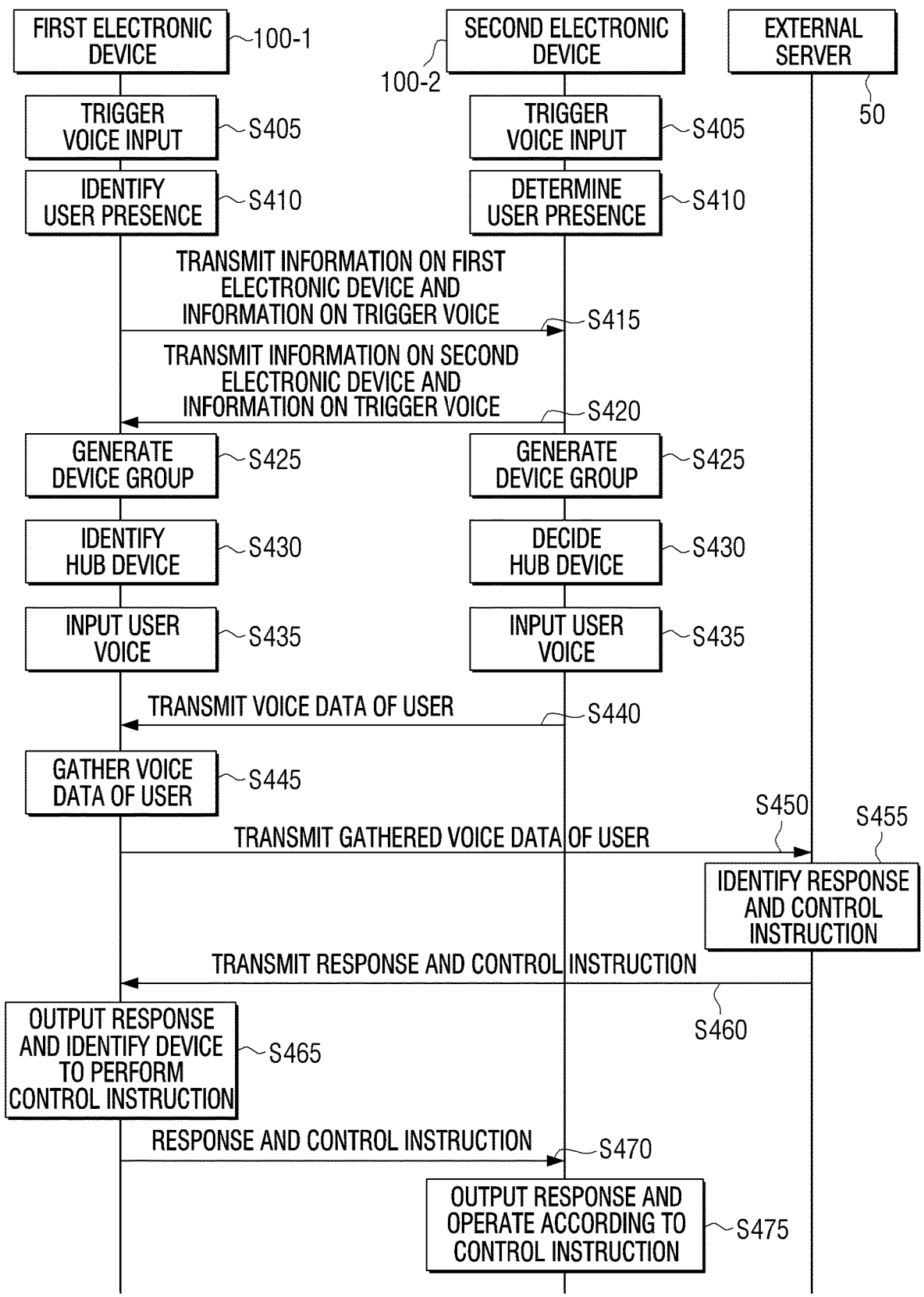
FIG. 4 is a sequence diagram of a method of providing an interactive service by deciding on a hub device from a plurality of electronic devices according to an embodiment.

FIG. 4 is a sequence diagram of a method of providing an interactive service by deciding on (e.g., determining, identifying, etc.) a hub device from a plurality of electronic devices according to an embodiment. Referring to FIG. 4, the a electronic device 100-1 and a second electronic device 100-2 may be electronic devices present in a home, and an interactive service may be provided through an external server 50.

Each of the first electronic device 100-1 and the second electronic device 100-2 may receive an input of the trigger voice (operation S405). At this time, the trigger voice is a voice for initiating an interactive service performing voice recognition, and may also be known as a wakeup voice. In an embodiment, a general user voice may be input in addition to the trigger voice. That is, the first electronic device 100-1 and the second electronic device 100-2 may identify whether a user is present through a natural conversation of the user.

Each of the first electronic device 100-1 and the second electronic device 100-2 may identify a presence of a user (operation S410). Herein, each of the first electronic device 100-1 and the second electronic device 100-2 may identify whether a user is present within the threshold range from each of the first electronic device 100-1 and the second electronic device 100-2 based on the volume of the received trigger voice and the arrival time. For example, each of the first electronic device 100-1 and the second electronic device 100-2 may identify whether a trigger voice having a volume greater than or equal to a threshold value has been detected and whether the trigger voice arrived within a threshold time to identify whether the user is present within the threshold range from each of the first electronic device 100-1 and the second electronic device 100-2. At this time, the threshold range may refer to a predetermined distance (for example, within 3 m) or the same spatial extent. Further, the threshold (e.g., predetermined) value may refer to the volume in which a volume of the general voice is experimentally detected from a predetermined distance. Further, the threshold (e.g., predetermined) time may refer to the arrival time of the voice of the user reaching the predetermined distance.

Each of the first electronic device 100-1 and the second electronic device 100-2 may use, in addition to the volume of the trigger voice, at least one of use information of the electronic device, use statistics information of the electronic device, and movement information of the user to identify whether a user is present around the electronic device. For example, each of the first electronic device 100-1 and the second electronic device 100-2 may identify whether a user is present around the electronic device based on whether a user instruction is input within the threshold time (for example, 30 seconds) from the current time through the corresponding inputter 170, may identify whether a user is present around the electronic device based on use statistics information of the electronic device based on time, and may identify whether a user is present around the electronic device by identifying whether a user is detected through the sensor 180 or a user movement is detected.

Based on identifying that a user is present, the first electronic device 100-1 may transmit information on the first electronic device 100-1 and trigger voice (for example, volume information of trigger voice received by the first electronic device 100-1, signal-to-noise (SNR) information of the trigger voice, information of score of voice quality, etc.) to the second electronic device 100-2 (operation S415). At this time, each of the first electronic device 100-1 and the second electronic device 100-2 may calculate a voice quality score directly based on information on the trigger voice.

In addition, the second electronic device 100-2 may transmit information on the first electronic device 100-1 and information on the trigger voice (for example, volume information of trigger voice received by the second electronic device 100-2, etc.) to the second electronic device 100-2 (operation S420).

Each of the first electronic device 100-1 and the second electronic device 100-2 may generate a device group based on information on the received trigger voice (operation S425). Specifically, each of the first electronic device 100-1 and the second electronic device 100-2 may generate a device group by identifying whether the volume or SNR on the received trigger voice is a predetermined threshold value or more. For example, based on the volume of the trigger voice or SNR received by the first electronic device 100-1 being a threshold value or more, and the volume of the trigger voice or SNR received by the first electronic device 100-1 being a threshold value or more, each of the first electronic device 100-1 and the second electronic device 100-2 may decide the first electronic device 100-1 and the second electronic device 100-2 as a device group. According to another example, each of the first electronic device 100-1 and the second electronic device 100-2 may generate a device group by identifying whether the voice quality score for the received trigger voice is a predetermined threshold value or more. For example, based on the voice quality score of the trigger voice received by the first electronic device 100-1 being a threshold value or more and the voice quality score of the trigger voice received by the first electronic device 100-1 being a threshold value or more, each of the first electronic device 100-1 and the second electronic device 100-2 may decide the first electronic device 100-1 and the second electronic device 100-2 as a device group.

Each of the first electronic device 100-1 and the second electronic device 100-2 may identify a hub device based on information on the received other electronic device (operation S430). Specifically, each of the first electronic device 100-1 and the second electronic device 100-2 may identify a hub device based on at least one of information on an Internet connection status of the electronic device, information on a power status of the electronic device, information on a memory of the electronic device, information on a distance between the electronic device and the user, and information on a voice recognition function of the electronic device.

Further, each of the first electronic device 100-1 and the second electronic device 100-2 may identify a candidate hub device based on whether an artificial intelligence service may be provided in the electronic device, whether the electronic device is connected to an external network, the battery state, and the available memory space. That is, each of the first electronic device 100-1 and the second electronic device 100-2 may identify an electronic device, which provides the artificial intelligence service within the electronic device or the electronic device may be connected to an external network, the battery is a threshold value or more (for example, 10% or more), and the available memory space is a threshold value or more (for example, 100 kb), as a candidate hub device. That is, to be a hub device, an artificial intelligence service capable of voice recognition may be provided or may be connected to an external internet network, a minimum battery and a minimum available memory may be required.

In addition, each of the first electronic device 100-1 and the second electronic device 100-2 may identify a final hub device from the candidate hub devices based on a processing capability (for example, CPU speed and processing amount) of the electronic device, a communication connection strength between the electronic device and an access point (AP), and a distance between the electronic device and the user. Herein, each of the first electronic device 100-1 and the second electronic device 100-2 may calculate a score for deciding the final hub device by adding a weight to the processing capability of the electronic device, the communication connection strength between the electronic device and AP, and the distance between the electronic device and user, and may identify the final hub device by comparing the calculated scores.

In the above-described embodiment, each of the first electronic device 100-1 and the second electronic device 100-2 have been described as deciding the final hub device, but it is understood that one or more other embodiments are not limited thereto. For example, based on a predetermined hub device existing according to another embodiment, the predetermined hub device may decide the final hub device through the above-described operations.

By way of example, each of the first electronic device 100-1 and the second electronic device 100-2 may decide the first electronic device 100-1 as the final hub device.

Each of the first electronic device 100-1 and the second electronic device 100-2 may receive a user voice input (operation S435). At this time, user voice may be a voice for controlling the electronic device in the home or may be the voice of the user for receiving a response to the voice of the user. For example, each of the first electronic device 100-1 and the second electronic device 100-2 may receive a user voice input such as "turn light off"

The second electronic device 100-2 may transmit voice data of the user to the first electronic device 100-1, which is the hub device (operation S440).

The first electronic device 100-1 may gather voice data of the user received through the microphone and the voice data of the user received from the second electronic device 100-2 (operation S445). Herein, the first electronic device 100-1 removes noise from each of the voice data of the user received through the microphone and the voice data of the user received from the second electronic device 100-2, and may synchronize and gather the noise-removed voice data.

The first electronic device 100-1 may transmit the gathered voice data of the user to the external server 50 (operation S450). At this time, the gathered voice data of the user may be audio data and not text data.

The external server 50 may identify a response and a control instruction based on the received voice data of the user (operation S455). Herein, the external server 50 may obtain a response in a natural language form based on the dialogue system shown in FIG. 8. Further, the external server 50 may identify both a response and a control instruction, or may identify only one of the response and the control instruction.

The external server 50 may transmit the received response and the control instruction to the first electronic device 100-1 (operation S460).

The first electronic device 100-1 outputs the response, and may identify a device to perform the control instruction (operation S465). The first electronic device 100-1 may be identified as the device to output the response based on information on the location of the user and the speaker. Specifically, the first electronic device 100-1 may identify a device to output the response considering the distance from the user and performance of the speaker (for example, output amount) from among the electronic devices with speakers.

In addition, the first electronic device 100-1 may identify a device for performing control instructions based on the location and function of the pre-stored electronic devices. For example, the first electronic device 100-1 may identify the second electronic device 100-2 provided with a light as the device to perform the control instructions. However, this is merely one embodiment, and the device for outputting the response and the voice for performing the control instructions may be different in one or more other embodiments. For example, the response may be output by the first electronic device 100-1, and the control instruction may be performed by the second electronic device 100-2.

The first electronic device 100-1 may transmit the response and control instruction to the second electronic device 100-2 (operation S470), and the second electronic device 100-2 may output the received response and perform an operation according to the control instruction (operation S475).

In the above-described embodiment, the first electronic device 100-1 has been described as obtaining a control instruction and a response through an external server 50, but this is merely one embodiment, and the first electronic device 100-1 may recognize the gathered voice data and obtain a control instruction and/or a response in one or more other embodiments. Specifically, the first electronic device 100-1 may identify whether the control instruction and the response corresponding to the gathered voice data (e.g., by comparing to a pre-stored voice instruction set) is stored in the first electronic device 100-1. Further, based on the control instruction and/or the response corresponding to the gathered voice data being stored in the first electronic device 100-1, the first electronic device 100-1 may obtain the control instruction and/or the response based on the stored voice instruction set. However, if the control instruction and the response corresponding to the gathered voice data is not stored in the first electronic device 100-1, the first electronic device 100-1, as described above, may transmit the gathered voice data to the external server 50.

Figure 5:
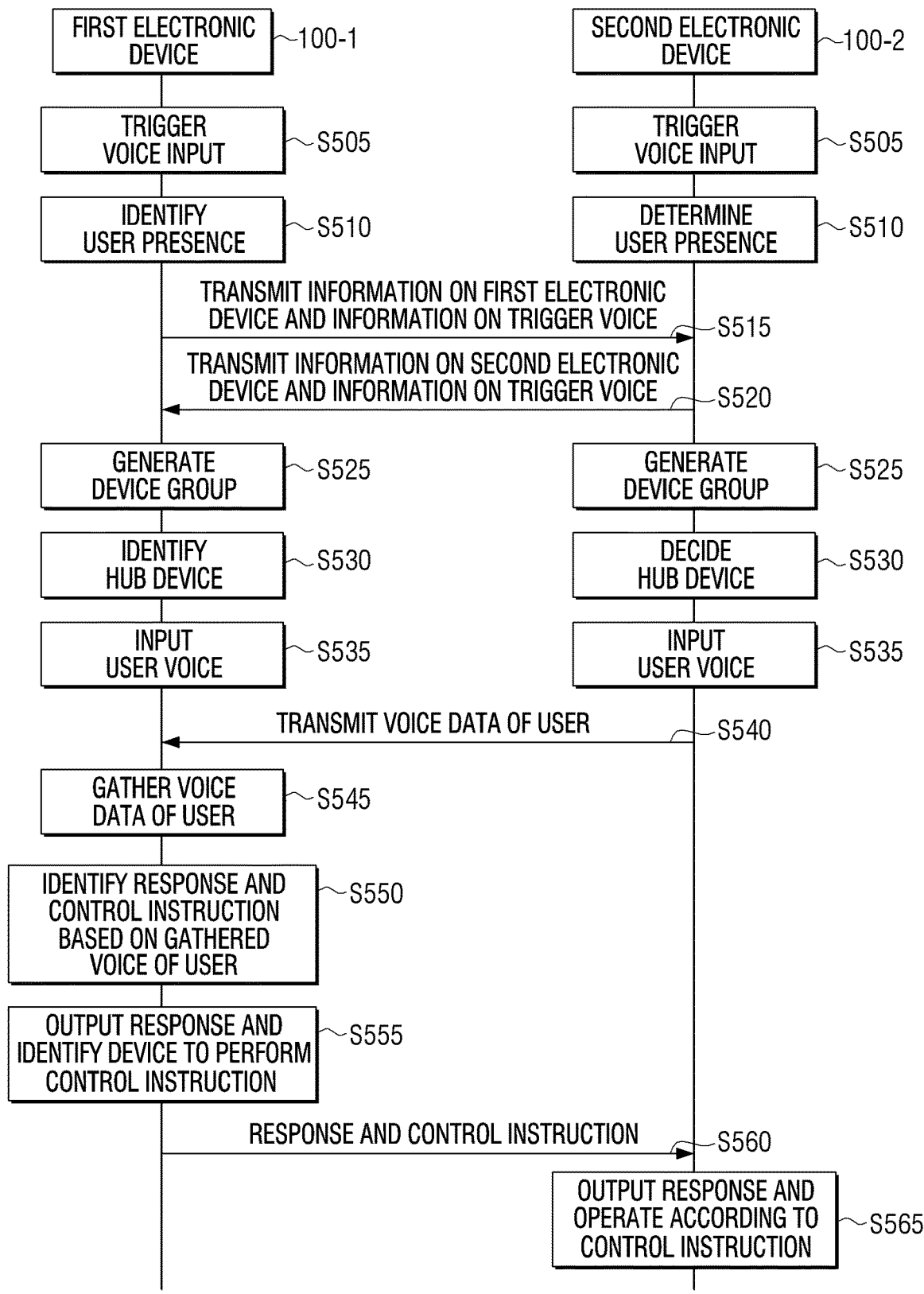
FIG. 5 is a sequence diagrams of a method of providing an interactive service by deciding on a hub device from a plurality of electronic devices according to an embodiment.

FIG. 5 is a sequence diagram of a method of providing an interactive service by deciding on a hub device from a plurality of electronic devices according to an embodiment. Referring to FIG. 5, the first electronic device 100-1 and the second electronic device 100-2 may be an electronic device present in a home, and an artificial intelligence program capable of providing an interactive service by performing voice recognition may be stored in the first electronic device 100-1. Operations S405 to S445 described in FIG. 4 are the same as or similar to operations S505 to S545 in FIG. 5, and repetitive descriptions thereof may be omitted below.

The first electronic device 100-1 may decide a response and a control instruction based on the gathered voice data of the user (operation S550). At this time, the first electronic device 100-1 may obtain a response in natural language form based on the dialogue system shown in FIG. 8. Further, the first electronic device 100-1 may identify both the response and the control instruction, or may identify one of the response and the control instruction.

The first electronic device 100-1 outputs a response, and may identify a device to perform a control instruction (operation S555). Herein, the first electronic device 100-1 may identify the closest device to the user based on the location of the user as the device to output the response. Further, the first electronic device 100-1 may identify a device to perform the control instruction based on the location and function of the pre-stored electronic devices. For example, the first electronic device 100-1 may identify the second electronic device 100-2 closest to the moved user as the device to output the response, and may decide the second electronic device 100-2 provided with a light as the device to perform the control instruction.

The first electronic device 100-1 may transmit a response and a control instruction to the second electronic device 100-2 (operation S560), and the second electronic device 100-2 may output the received response and may perform an operation according to the control instruction (operation S565).

FIGS. 6A to 6D are diagrams to describe operations for providing an interactive service by deciding (e.g., determining, identifying, etc.) a hub device from a plurality of electronic devices according to an embodiment. As shown is FIG. 6A, first to ninth electronic devices 100-1 to 100-9 may be included in the home. Herein, first to third electronic devices 100-1 to 100-3 may be located in the family room, fourth to sixth electronic devices 100-4 to 100-6 may be located in the main bedroom, a seventh electronic device 100-7 may be located in the bathroom, and eighth and ninth electronic devices 100-8 and 100-9 may be located in the kitchen.

Figure 6A:
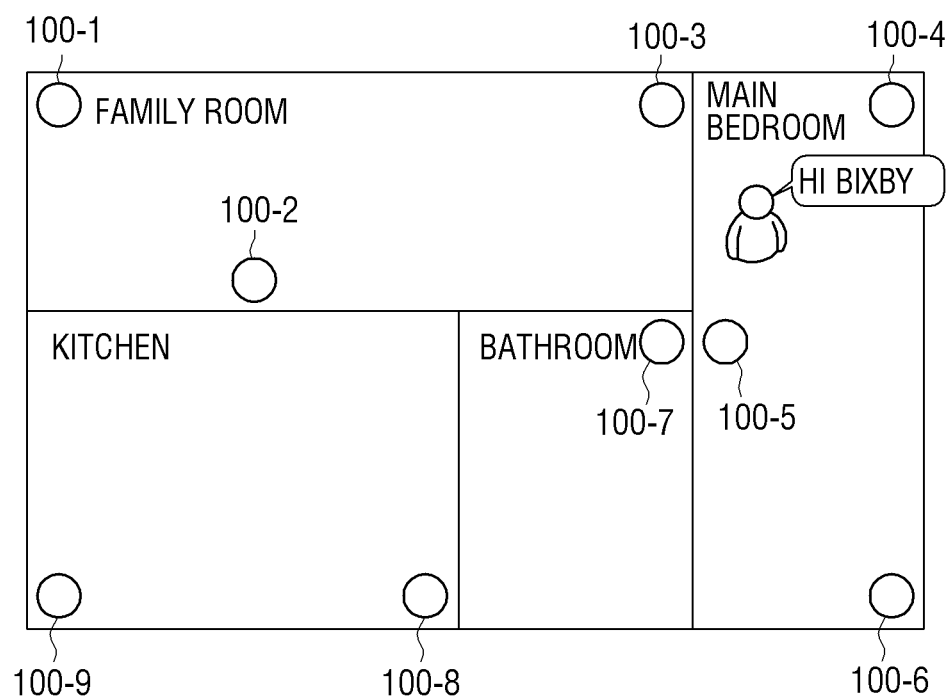
FIG. 6A is a diagram to describe a method of providing an interactive service by deciding a hub device from a plurality of electronic devices according to an embodiment.

As shown in FIG. 6A, a user may utter the trigger voice "Hi Bixby" in the main bedroom.

Each of the fourth to sixth electronic devices 100-4 to 100-6 may receive the trigger voice "Hi Bixby" through the microphone. Each of the fourth to sixth electronic devices 100-4 to 100-6 may identify that a user is present around the fourth to sixth electronic devices 100-4 to 100-6 based on the volume of the received trigger voice.

Figure 6B:
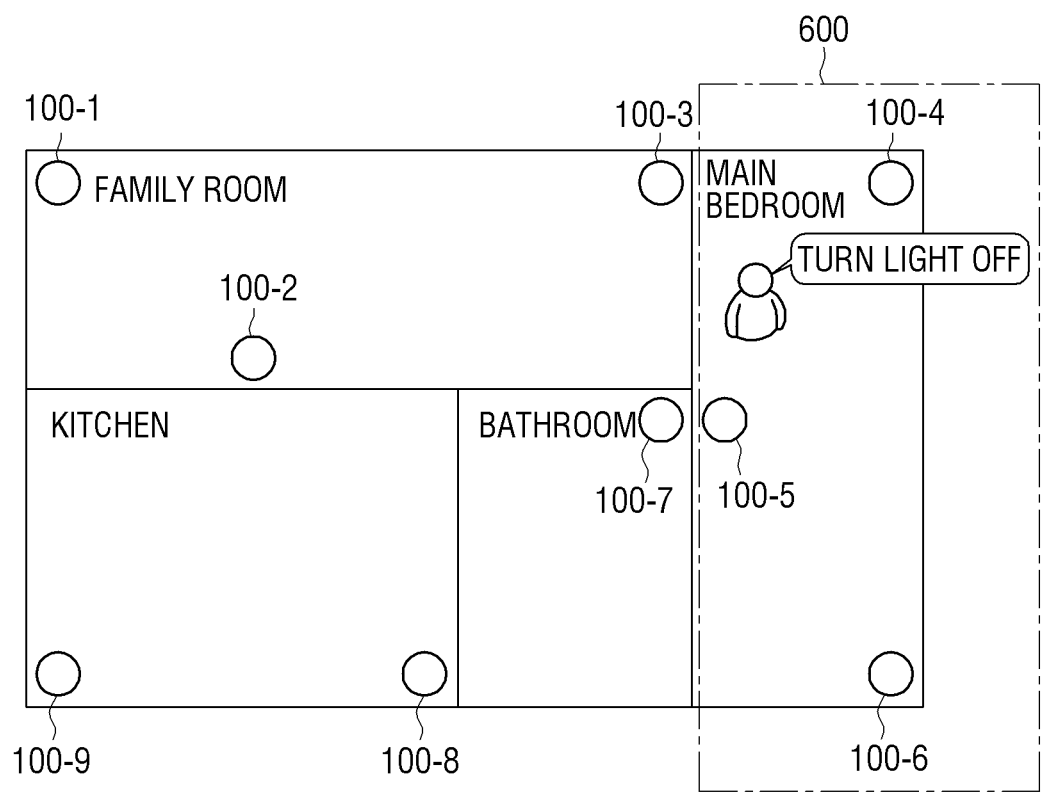
FIG. 6B is a diagram to describe a method of providing an interactive service by deciding a hub device from a plurality of electronic devices according to an embodiment.

In addition, each of the fourth to sixth electronic devices 100-4 to 100-6 exchanges the volume of the received trigger voice therebetween and, as shown in FIG. 6B, the fourth to sixth electronic devices 100-4 to 100-6 may be identified as one device group 600. Further, each of the fourth to sixth electronic devices 100-4 to 100-6 may decide the fourth to sixth electronic devices 100-4 to 100-6 as one device group based on the location of the pre-stored electronic devices.

In addition, each of the fourth to sixth electronic devices 100-4 to 100-6 may identify a hub device by exchanging information on the electronic device. Herein, each of the fourth to sixth electronic devices 100-4 to 100-6 may identify the fifth electronic device 100-5 as the hub device based on the same method as described above.

Based on the hub device being identified, each of the fourth to sixth electronic devices 100-4 to 100-6, as shown in FIG. 6B, may obtain the voice (i.e., voice input) of the user such as "turn light off" At this time, the fourth to sixth electronic devices 100-4 to 100-6 may transmit the voice data received through the microphone to the fifth electronic device 100-5.

The fifth electronic device 100-5 may gather the voice data received from the fourth to sixth electronic devices 100-4 to 100-6 and the voice data obtained through the microphone provided on the fifth electronic device 100-5 and may obtain the voice data of the user.

The fifth electronic device 100-5 may transmit the gathered voice data to the external server 50, and may receive a response, such as "turning main bedroom light off" and a control instruction such as "light off," to the voice data from the external server 50.

The fifth electronic device 100-5 may identify a device to output the received response and the device to receive the control instruction. Specifically, the fifth electronic device 100-5 may identify the fifth electronic device 100-5 present closest to the user as the device to output the response, and may identify the fourth to sixth electronic devices 100-4 to 100-6, which are present in the main bedroom and include lights, as the devices to perform the control instruction based on information on the location of the pre-stored electronic devices and the functions thereof.

Figure 6C:
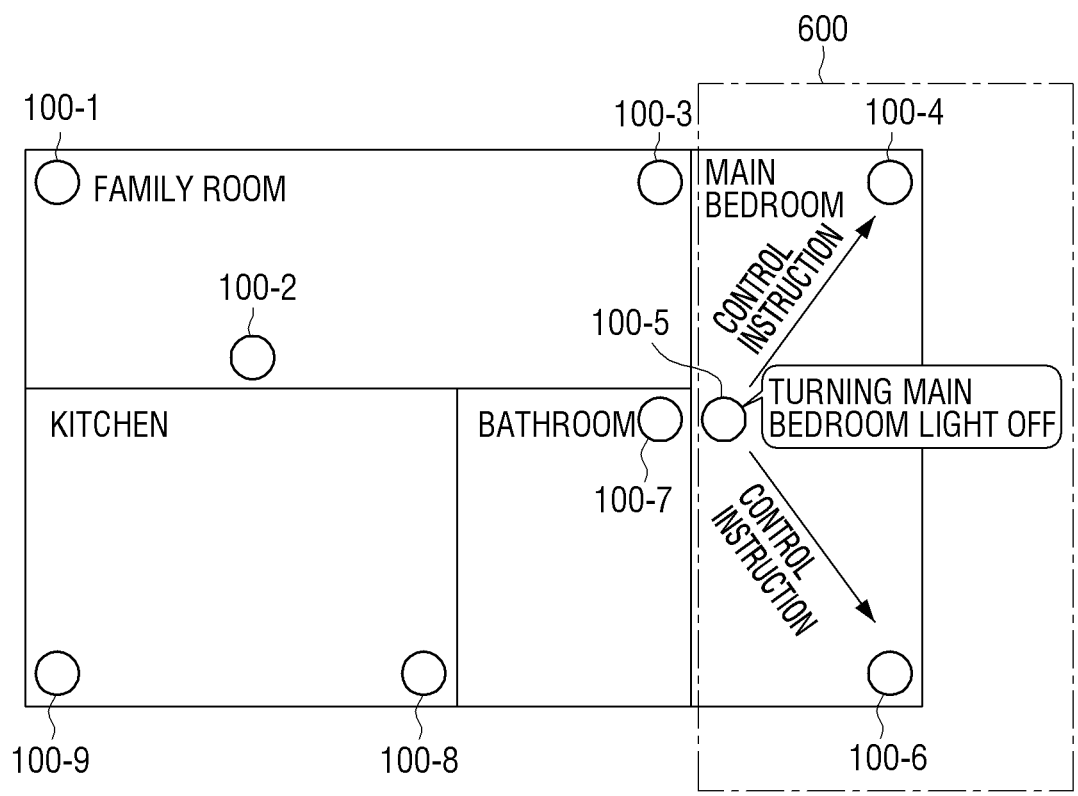
FIG. 6C is a diagram to describe a method of providing an interactive service by deciding a hub device from a plurality of electronic devices according to an embodiment.

The fifth electronic device 100-5, as shown in FIG. 6C, may output a response such as "turning main bedroom light off" and may transmit a control instruction "light off" to the fourth to sixth electronic devices 100-4 to 100-6. The fourth to sixth electronic devices 100-4 to 100-6 may perform the function of turning power off on lights based on the received control instruction.

In addition, the fifth electronic device 100-5 may identify another electronic device that does not obtain voice as a device to receive control instruction. Specifically, the fifth electronic device 100-5 may obtain information on an electronic device with the light on currently in the home and may decide the third, fourth, sixth and seventh electronic devices 100-3, 100-4, 100-6 and 100-7 with the light on (or simply, with a light irrespective of whether on or off) from among the electronic devices present currently in the home as devices to perform the control instruction. That is, the fifth electronic device 100-5 may not only decide the fourth and sixth electronic devices 100-4 and 100-6 that received the voice of the user as the electronic devices to receive the control instruction, but also decide the third and seventh electronic devices 100-3 and 100-7 (or electronic devices not part of the device group) that does not receive the voice of the user as electronic devices to receive the control instruction.

Figure 6D:
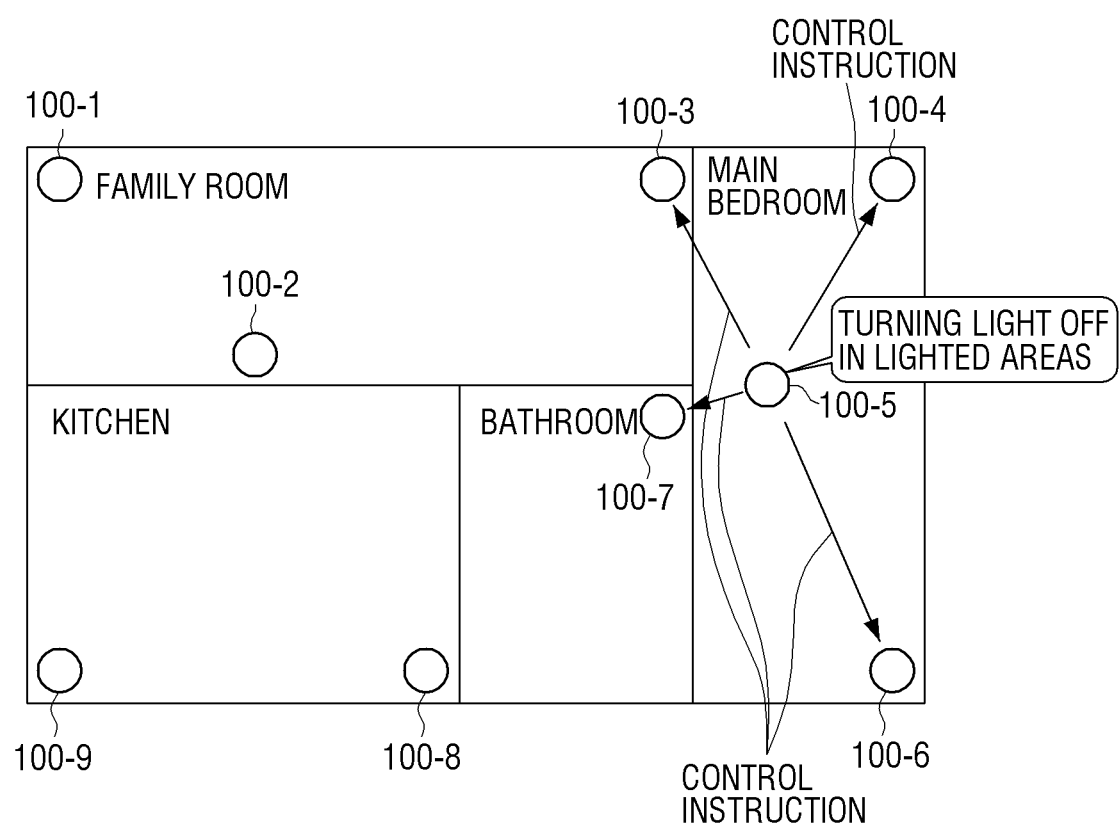
FIG. 6D is a diagram to describe a method of providing an interactive service by deciding a hub device from a plurality of electronic devices according to an embodiment.

The fifth electronic device 100-5 may, as shown in FIG. 6D, output a response such as "turning light off in lighted areas," and may transmit a control instruction such as "light off" to the third, fourth, sixth and seventh electronic devices 100-3, 100-4, 100-6 and 100-7. The third, fourth, sixth and seventh electronic devices 100-3, 100-4, 100-6 and 100-7 may perform the function of turning power off on lights based on the received control instruction.

In the example described with reference to FIG. 6D, the external server 50 may transmit a control instruction to the third, fourth, sixth and seventh electronic devices 100-3, 100-4, 100-6 and 100-7 through the fifth electronic device 100-5, but this is merely one embodiment, and the external server 50 may directly transmit the control instruction to the third, fourth, sixth and seventh electronic devices 100-3, 100-4, 100-6 and 100-7 in accordance with one or more other embodiments. That is, the external server 50 may identify the third, fourth, sixth and seventh electronic devices 100-3, 100-4, 100-6 and 100-7 as electronic devices with lights on (or simply with lights, irrespective of an on/off state) currently in the home, and may transmit a control instruction to the identified third, fourth, sixth and seventh electronic devices 100-3, 100-4, 100-6 and 100-7.

Figure 7:
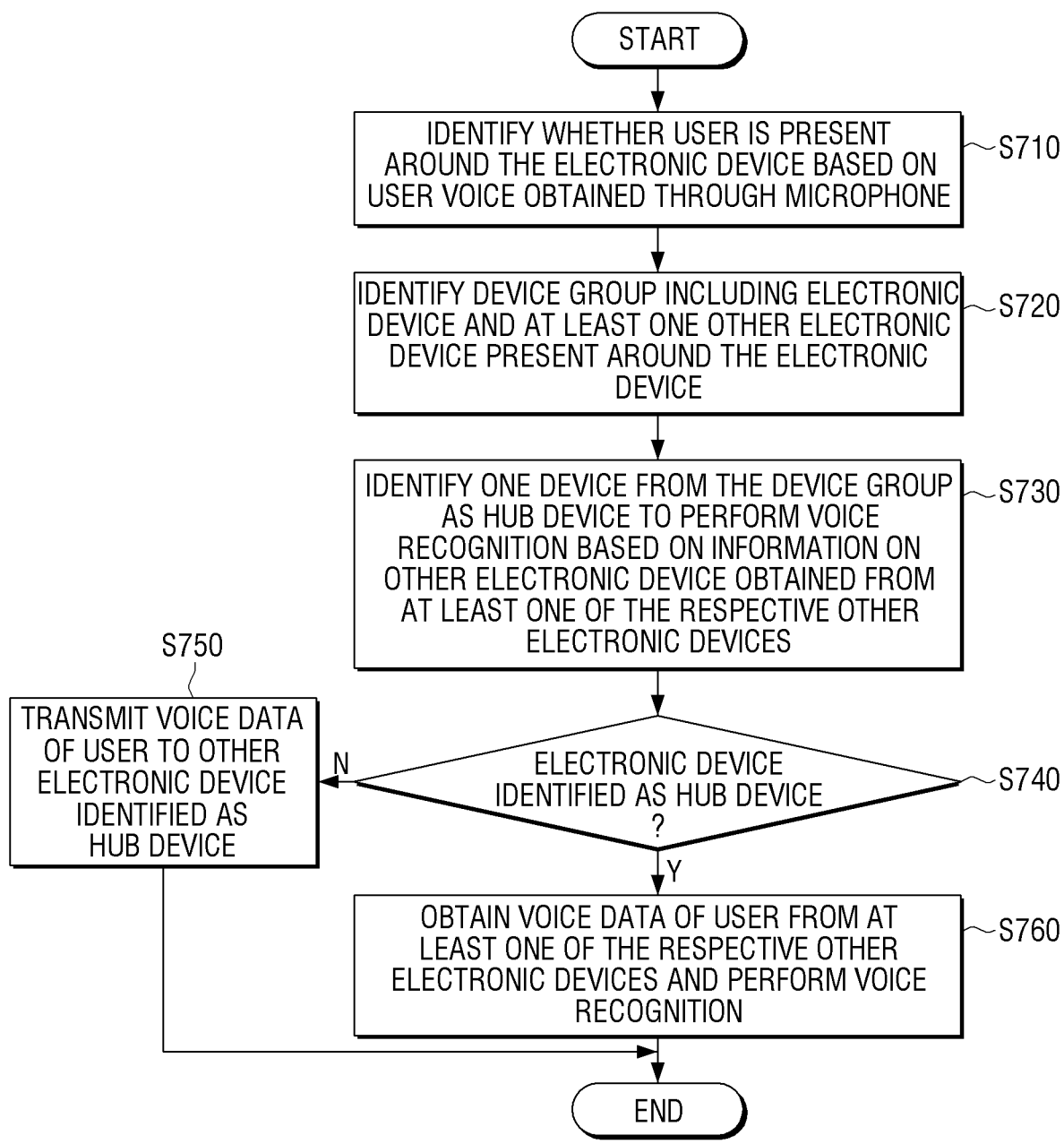
FIG. 7 is a flowchart of a control method of an electronic device according to an embodiment.

FIG. 7 is a flowchart of a control method of an electronic device 100 according to an embodiment.

Referring to FIG. 7, the electronic device 100 may identify whether a user is present around the electronic device 100 based on a voice of the user received through a microphone (operation S710). At this time, the electronic device 100 may identify whether a user is present around the electronic device 100 using, in addition to the voice of the user, at least one of use information of the electronic device 100, use statistics information of the electronic device 100, and movement information of the user.

Based on a user being present around the electronic device 100, the electronic device may identify a device group including the electronic device 100 and at least one other electronic device present around the electronic device 100 (operation S720). Herein, the electronic device 100 may identify a device group based on the volume of the voice of user received from the at least one other electronic device, and may identify the device group based on the location information of pre-stored electronic devices.

The electronic device 100 may identify one device from the device group based on information on the other electronic device received from at least one of the respective other electronic devices as a hub device to perform voice recognition (operation S730). Specifically, the electronic device 100 may identify a hub device based on at least one of information on an Internet connection status of the electronic devices, information on a power status of the electronic devices, information on a memory of the electronic devices, information on a distance between the electronic devices and the user, and information on a voice recognition function of the electronic devices.

The electronic device 100 may identify whether the electronic device 100 has been identified as the hub device (operation S740).

Based on the electronic device 100 being identified as the hub device (operation S740-Y), the electronic device 100 may receive the voice data of the user from at least one of the respective other electronic devices and perform voice recognition (operation S760). At this time, voice recognition may be performed in the electronic device 100, and may be performed through the external server 50.

Based on the other electronic device being identified as the hub device (operation S740-N), the electronic device 100 may transmit voice data of the user to the other electronic device identified as the hub device (operation S750).

According to an embodiment as described above, based on adaptively deciding on the hub device according to the location of the user, unnecessary network overhead may be eliminated, and a more accurate interactive service may be provided.

FIG. 8 is a block diagram of a dialogue system of an artificial intelligence agent system according to an embodiment. The dialogue system 800 shown in FIG. 8 is a configuration to perform a conversation through a virtual artificial intelligence agent and natural language, and may be stored in the memory 130 of the electronic device 100. It is understood, however, that one or more other embodiments are not limited thereto. For example, according to another embodiment, the dialogue system 800 may be included in at least one external server 50.

As shown in FIG. 8, the dialogue system 800 may include an automatic speech recognition (ASR) module 810 (e.g., automatic speech recognizer, automatic speech recognition circuitry, automatic speech recognition code, etc.), a natural language understanding (NLU) module 820 (e.g., NLU circuitry, NLU code, etc.), a dialogue manager (DM) module 830 (e.g., DM, DM circuitry, DM code, etc.), a natural language generator (NLG) module 840 (e.g., NLG, NLG circuitry, NLG code, etc.), and a text-to-speech (TTS) module 850 (e.g., TTS circuitry, TTS code, etc.). Additionally, the dialogue system 800 may further include a path planner module (e.g., path planner, path planner circuitry, path planner code, etc.) and/or an action planner module (e.g., action planner, action planner circuitry, action planner code, etc.).

An automatic speech recognition (ASR) module 810 may convert voice data of the user received from the electronic device 100 to text data. For example, the automatic speech recognition module 810 may include an utterance recognition module (e.g., utterance recognizer, utterance recognition circuitry, utterance recognition code, etc.). The utterance recognition module may include an acoustic model and a language model. For example, the acoustic model may include information related to speech and the language model may include unit phonemic information and information on a combination of unit phonemic information. The utterance recognition module uses information related to speech and information on unit phonemic information to convert user utterance to text data. Information on the acoustic model and the language model, for example, may be stored in the automatic speech recognition database (ASR DB) 815.

A natural language understanding module 820 may perform a syntactic analysis or semantic analysis to identify user intent. The syntactic analysis divides user input to syntactic units (for example, word, phrase, morpheme, etc.), and may identify what syntactic elements the divided units have. The semantic analysis may be performed using semantic matching, rule matching, formula matching and the like. Accordingly, the natural language understanding module 820 may obtain a parameter (or slot) necessary for user input to express its domain, intent or intent.

The natural language understanding module 820 uses matching rules divided by parameter (or slot) necessary to identify domain, intent to decide the intent of the user and the parameter. For example, one domain (e.g., alarm) may include a plurality of intents (e.g., setting alarm, cancelling alarm, etc.), and one intent may include a plurality of parameters (e.g., time, number of repetitions, alarm sound, etc.). A plurality of rules, for example, may include one or more essential element parameters. The matching rules may be stored in the natural language understanding database (NLU DB) 825.

The natural language understanding module 820 uses language characteristics (e.g., syntactic elements) such as morphemes and phrases to identify the meaning of the words extracted from the user input, and matches the meaning of the identified word to the domain and the intent to decide user intent. For example, the natural language understanding module 820 calculates how much the word extracted from user intent is included in each of the domain and the intent to decide the user intent. According to an embodiment, the natural language understanding module 820 uses the word that is the basis in identifying intent to identify the parameter of user input. Further, according to an embodiment, the natural language understanding module 820 uses a natural language understanding database 825, where linguistic characteristics to identify intent of user input are stored, to decide user intent.

The natural language understanding module 820 uses a knowledge base 835 to decide user intent. For example, the natural language understanding module 820 uses user information (e.g., preferred phrase, preferred content, contact list, music list, etc.) to decide user intent. According to an embodiment, the automatic speech recognition module 810 further to the natural language understanding module 820 may also recognize the voice of the user referencing the knowledge base 835.

The natural language understanding module 820 may generate a path rule based on the intent of user input and the parameter. For example, the natural language understanding module 820 selects the application to be executed based on the intent of user input, and may identify the operation to be performed in the selected application. The natural language understanding module 820 decides on the parameter corresponding to the identified operation to generate a path rule. According to an embodiment, the path rule generated by the natural language understanding module 820 may include information on the application to be executed, on operation to be executed in the application, and on the parameter necessary in executing the operation.

The natural language understanding module 820 may generate one path rule or a plurality of path rules based on the intent of user input and the parameter. For example, the natural language understanding module 820 may receive three path rules corresponding to the electronic device from a path planner module and maps the intent of the user and the parameter to the three received path rules to decide the path rule. At this time, the path rule may include information on an operation (or action) for performing a function of the application and information on a parameter necessary for executing an operation. Further, the path rule may include the operation order of the application. The electronic device receives the path rule, selects an application according to the path rule, and executes an operation included in the path rule in the selected application.

The natural language understanding module 820 decides the application to be executed, the operation to be executed in the application, and the parameter necessary in executing the operation to generate one path rule or a plurality of path rules. For example, the natural language understanding module 820 uses information of the electronic device 100 to arrange the application to be executed and the operation to be executed in the application in an ontology format or a graph model format according to the intent of the user and generates the path rule. The generated path rule, for example, may be stored in a path rule database through the path planner module. The generated path rule may be added with three path rules of the database 825.

The natural language understanding module 820 may select at least one path rule from among the plurality of generated path rules. For example, the natural language understanding module 820 may select a plurality of path rules or the optimum path rule. In another example, the natural language understanding module 820 may select a plurality of path rules in the case a portion of the operations is specified based on user utterance. The natural language understanding module 820 may identify one path rule from among the plurality of path rules based on an additional input of the user.

The dialogue manager module 830 may identify whether the intent of the user identified by the natural language understanding module 820 is clear. For example, the dialogue manager module 830 may, based on whether information of the parameter is sufficient, identify whether user intent is clear. The dialogue manager module 830 may identify whether the parameter identified in the natural language understanding module 820 is sufficient in performing a task. According to an embodiment, the dialogue manager module 830 may, based on the user intent not being clear, perform feedback requesting information from the user. For example, the dialogue manager module 830 may perform a feedback requesting information on the parameter to identify user intent. Further, the dialogue manager module 830 may generate and output a message to confirm a question of the user including text, which has been converted by the natural language understanding module 820.

According to an embodiment, the dialogue manager module 830 may include a content provider module (e.g., content provider, content provider circuitry, content provider code, etc.). The content provider module may, based on being able to perform an operation based on the identified intent and parameter by the natural language understanding module 820, generate a result having executed the task corresponding to user input.

According to another embodiment, the dialogue manager module 830 uses the knowledge base 835 to provide a response to a voice of a user. Herein, the knowledge base 835 may be included in the electronic device 100, or may be included in an external device or server.

The natural language generator (NLG) module 840 may change designated information to a text form. Information changed to the text form may be in the form of utterance of the natural language. The designated information may be, for example, information on additional input, information guiding completion of an operation corresponding to user input, or information guiding additional input by the user (e.g., feedback information on user input). Information changed (or converted) to the text form may be displayed in the display of the electronic device 100, or may be changed to voice form by the text-to-speech (TTS) module 850.

The text-to-speech (TTS) module 850 may change information in the text form to information in the voice form. The text-to-speech (TTS) module 850 may receive information in the text form from the natural language generator module 840, and may change information in text form to information in voice form to output through the speaker.

The natural language understanding module 820 and the dialogue manager module 830 may be implemented as one module. For example, the natural language understanding module 820 and the dialogue manager module 830 may be implemented as one module to identify the user intent and the parameter, and may obtain a response (for example, path rule) corresponding to the identified user intent and parameter.

The terms "part" or "module" used in the present disclosure may include a unit implemented with hardware, software, or firmware, and may be used interchangeably with terms such as logic, logic blocks, parts, or circuits. "Part" or "module" may be a part integrally formed or a minimum unit or a part of the part performing one or more functions. For example, a module may be implemented in the form of an application-specific integrated circuit (ASIC).

One or more embodiments may be implemented with software including instructions stored in a machine-readable storage media (e.g., computer). The machine may call an instruction stored in the storage medium, and as a device capable of operating according to the called instruction, may include an electronic device (e.g., electronic device 100) according to embodiments. Based on the instruction being executed by the processor, the processor may directly or under the control of the processor perform a function corresponding to the instruction using different elements. The instructions may include a code generated by a compiler or executed by an interpreter. The machine-readable storage media may be provided in the form of a non-transitory storage medium. Herein, "non-transitory" merely means that the storage medium is tangible and does not include a signal and does not distinguish that data is permanently or temporarily stored in the storage medium.

According to an embodiment, a method according to one or more embodiments may be provided in a computer program product. The computer program product may be exchanged between a seller and a purchaser as a commodity. The computer program product may be distributed in the form of a machine-readable storage medium (e.g., a compact disc read only memory (CD-ROM)) or distributed online through an application store (e.g., PLAYSTORE™). In the case of online distribution, at least a portion of the computer program product may be at least stored temporarily in a storage medium such as a manufacturer's server, a server of an application store, or a memory of a relay server, or temporarily generated.

Each of the elements (e.g., a module or a program) according to various embodiments may be composed of a single entity or a plurality of entities, and some sub-elements of the abovementioned sub-elements may be omitted, or different sub-elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, omitted or a different operation may be added.

What is claimed is:

1. An electronic device comprising:
a microphone;
a communication interface;
a memory for storing at least one instruction; and
a processor configured to:
 determine whether a user is present around the electronic device based on voice data of the user obtained via the microphone,
 based on determining that the user is present around the electronic device, obtain information on the voice data of the user from a plurality of other electronic devices through the communication interface,
 identify at least one other electronic device, from the plurality of other electronic devices, that obtained the voice data of the user having a volume greater than or equal to a threshold value,
 determine a device group as comprising the identified at least one other electronic device,
 identify, based on information on the at least one other electronic device obtained respectively from the at least one other electronic device, at least one device from the device group as a hub device to perform a voice recognition, and
  based on identifying the electronic device as the hub device, obtain, through the communication interface, a voice data of the user from one or more of the at least one other electronic device, and perform the voice recognition.

2. The electronic device of claim 1, wherein the processor is further configured to:
  determine whether the user is present around the electronic device using at least one of use information of the electronic device, statistical information on use of the electronic device, or movement information of the user.

3. The electronic device of claim 1, wherein the processor is further configured to:
  based on determining that the user is present around the electronic device, identify the at least one other electronic device based on a location of the electronic device; and
  determine the device group as comprising the identified at least one other electronic device.

4. The electronic device of claim 1, wherein the information on the at least one other electronic device comprises at least one of information on internet connection status of the at least one other electronic device, information on a power status of the at least one other electronic device, information on memory of the at least one other electronic device, information on distance between the at least one other electronic device and the user, and information on a voice recognition function of the at least one other electronic device.

5. The electronic device of claim 1, wherein the processor is further configured to:
  control the communication interface to transmit the voice data of the user received from the one or more of the at least one other electronic device; and
  obtain, through the communication interface from an external server, at least one of a response to the voice data of the user and a control instruction corresponding to the voice data of the user.

6. The electronic device of claim 5, wherein the processor is further configured to:
  identify a device to output the response to the voice data of the user from among devices comprised in the device group based on a location of the user; and
  control the communication interface to transmit, to the identified device the response to the voice data of the user.

7. The electronic device of claim 1, wherein the processor is further configured to:
  identify at least one of a response to the voice data of the user or a control instruction corresponding to the voice data of the user based on the voice data of the user obtained from the one or more of the at least one other electronic devices.

8. The electronic device of claim 1, wherein the processor is further configured to,
  based on one other electronic device from among the at least one other electronic device being identified as the hub device, control the communication interface to transmit the voice data of the user obtained through the microphone to the one other electronic device identified as the hub device.

9. The electronic device of claim 1, wherein the processor is further configured to:
  based on no user being detected around the electronic device, terminate the voice recognition.

10. A control method of an electronic device, the control method comprising:
  determining whether a user is present around the electronic device based on voice data of the user received through a microphone;
  based on determining that the user is present around the electronic device, obtaining information on the voice data of the user from a plurality of other electronic devices through a communication interface,
  identifying at least one other electronic device, from the plurality of other electronic devices, that obtained the voice data of the user having a volume greater than or equal to a threshold value,
  determining a device group as comprising the identified at least one other electronic device,
  identifying, based on information on the at least one other electronic device obtained from the at least one other electronic device, at least one device from the device group as a hub device to perform a voice recognition; and
  based on identifying the electronic device as the hub device, obtaining a voice data of the user from one or more of the at least one other electronic device, and performing the voice recognition.

11. The control method of claim 10, wherein the determining whether the user is present around the electronic device comprises determining whether the user is present around the electronic device using at least one of use information of the electronic device, statistical information on use of the electronic device, or movement information of the user.

12. The control method of claim 10, wherein the determining the device group comprises:
  based on determining that the user is present around the electronic device, identifying the at least one other electronic device based on a location of the electronic device; and
  determining the device group as comprising the identified at least one other electronic device.

13. The control method of claim 10, wherein the information on the at least one other electronic device comprises at least one of information on internet connection status of the at least one other electronic device, information on a power status of the at least one other electronic device, information on memory of the at least one other electronic device, information on distance between the at least one other electronic device and the user, or information on a voice recognition function of the at least one other electronic device.

14. The control method of claim 10, wherein the performing the voice recognition comprises:
  transmitting, to an external server, the voice data of the user received from the one or more of the at least one other electronic devices; and
  obtaining, from the external server, at least one of a response to the voice data of the user and a control instruction corresponding to the voice data of the user.

15. The control method of claim 14, further comprising:
  identifying a device to output the response to the voice data of the user from among devices comprised in the device group based on a location of the user; and
  transmitting, to the identified device, the response to the voice data of the user.

16. The control method of claim 10, further comprising:
   identifying at least one of a response to the voice data of the user and a control instruction corresponding to the voice data of the user based on the voice data of the user obtained from the one or more of the at least one other electronic device.

17. The control method of claim 10, further comprising, based on one other electronic device from among the at least one other electronic device being identified as the hub device, transmitting the voice data of the user received through the microphone to the one other electronic device identified as the hub device.

18. The control method of claim 10, further comprising, based on no user being detected around the electronic device, terminating the voice recognition.

* * * * *